(12) United States Patent
Ostlund

(10) Patent No.: US 11,499,913 B2
(45) Date of Patent: Nov. 15, 2022

(54) METHOD AND DEVICE FOR MEASURING ABSORBANCE OF A SUBSTANCE IN SOLUTION WITH MULTIPLE LIGHT RAYS

(71) Applicant: Cytiva Sweden AB, Uppsala (SE)

(72) Inventor: Erik Nils Ostlund, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 280 days.

(21) Appl. No.: 16/078,681

(22) PCT Filed: Feb. 23, 2017

(86) PCT No.: PCT/EP2017/054225
§ 371 (c)(1),
(2) Date: Aug. 22, 2018

(87) PCT Pub. No.: WO2017/144607
PCT Pub. Date: Aug. 31, 2017

(65) Prior Publication Data
US 2019/0056316 A1 Feb. 21, 2019

(30) Foreign Application Priority Data
Feb. 23, 2016 (GB) ...................................... 1603051

(51) Int. Cl.
*G01N 21/33* (2006.01)
*G02B 27/14* (2006.01)
(Continued)

(52) U.S. Cl.
CPC ........... *G01N 21/33* (2013.01); *G02B 27/144* (2013.01); *G02B 27/145* (2013.01); *G01N 21/05* (2013.01);
(Continued)

(58) Field of Classification Search
CPC ............. G01N 21/33; G01N 2201/061; G01N 2201/0636; G01N 21/05; G02B 27/145; G02B 27/144; G02B 27/10
See application file for complete search history.

(56) References Cited

U.S. PATENT DOCUMENTS 4,525,627 A * 6/1985 Krempl ................ G01N 21/534
250/339.13
5,214,593 A 5/1993 Magnussen, Jr. et al.
(Continued)

FOREIGN PATENT DOCUMENTS

| EP | 2767821 A1 | 8/2014 |
| GB | 1365121 | 8/1974 |

(Continued)

OTHER PUBLICATIONS

PCT International Search Report and Written Opinion for PCT Application No. PCT/EP2017/054225 dated May 10, 2017 (11 pages).

(Continued)

*Primary Examiner* — Hwa Andrew Lee
(74) *Attorney, Agent, or Firm* — Eversheds Sutherland (US) LLP

(57) ABSTRACT

A measuring device for measuring the absorbance of a substance in at least one solution provided in at least two flow cells of the measuring device, wherein said measuring device comprises: —a light source transmitting a first light ray; —said at least two flow cells; —an optical arrangement comprising at least two semi-transparent mirrors with different transmission properties, said optical arrangement being arranged for dividing the first light ray coming from the light source into separate light parts, one for passing each flow cell and one for entering directly after the optical arrangement a reference detector; and —one detector pro- (Continued)

vided after each flow cell for detecting light having passed through the flow cells.

10 Claims, 2 Drawing Sheets

(51) Int. Cl.
    *G02B 27/10* (2006.01)
    *G01N 21/05* (2006.01)
(52) U.S. Cl.
    CPC ............... *G01N 2201/061* (2013.01); *G01N 2201/0636* (2013.01); *G02B 27/10* (2013.01)

(56) References Cited

U.S. PATENT DOCUMENTS

| | | |
|---|---|---|
| 2003/0218750 A1 | 11/2003 | Friberg et al. |
| 2010/0157300 A1 | 6/2010 | Lee et al. |
| 2010/0157307 A1 | 6/2010 | Taillade et al. |
| 2015/0153272 A1* | 6/2015 | Ehring ............... G01N 30/74 250/373 |

FOREIGN PATENT DOCUMENTS

| | | |
|---|---|---|
| JP | S5790144 A | 6/1982 |
| JP | S57-156542 A | 9/1982 |
| JP | 03-146852 A | 6/1991 |
| JP | H09281034 A | 10/1997 |
| JP | 2001-221738 A | 8/2001 |
| JP | 2011-174852 A | 9/2011 |

OTHER PUBLICATIONS

GB Search Report for GB Application No. 1603051.2 dated Jun. 16, 2016 (3 pages).

Japanese Office Action for JP Application No. 2018-544451 dated Nov. 4, 2020 (14 pages, with English translation).

Chinese Office Action for CN Application No. 201780025073.8 dated May 7, 2021 (20 pages, with English translation).

* cited by examiner

METHOD AND DEVICE FOR MEASURING ABSORBANCE OF A SUBSTANCE IN SOLUTION WITH MULTIPLE LIGHT RAYS

CROSS REFERENCE TO RELATED APPLICATIONS

This application claims the priority benefit of PCT/EP2017/054225 filed on Feb. 23, 2017 which claims priority benefit of Great Britain Application No. 1603051.2 filed Feb. 23, 2016. The entire contents of which are hereby incorporated by reference herein.

TECHNICAL FIELD OF THE INVENTION

The present invention relates to a method and a measuring device for measuring the absorbance of a substance in at least one solution.

BACKGROUND OF THE INVENTION

Many substances absorb ultra violet or visible light due to their chemical composition. The absorption of light by substances has been used as the basis for detecting the presence of, and measuring the concentration of, such substances for many years. The concentration of the substance can be determined by use of the Beer Lambert Law:

$$A = Ebc$$

Where:
A is light absorbance;
E is the molar light absorptivity with units of L mol$^{-1}$ cm$^{-1}$;
b is the light path length of the sample defined in cm; and
c is the concentration of the compound in solution, expressed in mol$^{-1}$.

The Emax represents the maximum absorption of a substance at a given wavelength.

The UV region can be considered to consist of light of wavelength in the region of 1 nm to 400 nm, light of wavelength of 180 nm to 300 nm being known as 'deep UV'. Most analytical instruments for detecting substances which absorb in the deep ultra violet (UV) region use a mercury-lamp, deuterium lamp or xenon flash lamp as a light source. One example of such an instrument is a flow cell in which a solution containing one or more UV absorbing substances is passed between a UV light source (e.g. a mercury-lamp) and a UV detector (e.g. a photomultiplier or a photodiode) and changes in the intensity of UV light reaching the detector are related to the concentration of UV absorbing substances in the solution.

The detection of proteins, nucleic acids and peptides are of great importance in many sectors, including the environmental, biological and chemical sciences. Proteins have mainly two absorption peaks in the deep UV region, one very strong absorption band with a maximum at about 190 nm, where peptide bonds absorb, and another less intense peak at about 280 nm due to light absorption by aromatic amino acids (e.g. tyrosine, tryptophan and phenylalanine).

Nucleic acids absorb UV light at around 260 nm, some of the subunits of nucleic acids (purines) having an absorbance maximum slightly below 260 nm while others (pyrimidines) have a maximum slightly above 260 nm. Almost all proteins have a maximum absorbance at about 280 nm due to the content of the light absorbing aromatic amino acids. The light source in the detectors of analytical systems used to detect and measure protein concentrations has historically been the mercury-line lamp. Mercury produces light with a wavelength of 254 nm but not at 280 nm, so a fluorescence converter is needed to transform the 254 nm light produced by the mercury lamp to longer wavelengths and a band pass filter is used to cut out a region around 280 nm. Mercury lamps have relatively short lifetimes and can prove unstable with time; furthermore, the disposal of these lamps can lead to environmental problems. The other lamps used to generate ultra violet light, such as the deuterium and the xenon flash lamps, disadvantageously require high voltages, need complicated electronics and often prove unstable with time. All of the currently used ultra violet light sources are relatively large and are consequently unsuitable for miniaturisation of analytical instruments. Moreover, all of the lamps generate significant amounts of heat due to the high voltages required for their operation.

WO2007/062800 and WO2013/178770 describe the use of a UV LED as a source of light for analysis of the concentration of a substance in a liquid sample.

Some applications, where the absorbance needs to be measured at more than one place in the liquid flow path, require several UV detectors to be used in the same instrument.

Since longer liquid flow paths is disadvantageous, due to e.g. band broadening, it is crucial to keep the instrument compact in size and thereby reduce length of capillaries (the liquid flow path).

SUMMARY

An object of the present invention is to provide an improved method and a device for measuring the absorbance of light of a substance in a solution.

This is achieved by a method for measuring the absorbance of light of a substance in at least one solution provided in at least two flow cells provided in a measuring device, said method comprising the steps of:
  transmitting a first light ray from a light source provided in the measuring device towards an optical arrangement provided in the measuring device;
  providing at least two beam splitters, for example semi-transparent mirrors with specific transmission properties in the optical arrangement, said optical arrangement being arranged for dividing the first light ray coming into the optical arrangement from the light source into separate light parts, one for passing each flow cell and one for entering directly after the optical arrangement a reference detector;
  detecting light having passed each flow cell;
  comparing the detected light having passed each flow cell and light detected by the reference detector for determining the absorbance of the substance in the solution.

This is also achieved by a measuring device for measuring the absorbance of a substance in at least one solution provided in at least two flow cells of the measuring device, wherein said measuring device comprises:
  a light source transmitting a first light ray;
  said at least two flow cells;
  an optical arrangement comprising at least two beam splitters, for example semi-transparent mirrors with different transmission properties, said optical arrangement being arranged for dividing the first light ray coming from the light source into separate light parts, one for passing each flow cell and one for entering directly after the optical arrangement a reference detector; and one detector provided after each flow cell for detecting light having passed through the flow cells.

Hereby more than one measurement can be provided in the same device and using the same light source and reference detector. The use of the same light source and the same reference detector for multiple measurements improves consistency between the measurements and improves possibility for direct comparisons between measurement results.

Furthermore an instrument that can carry more functionality per unit area is beneficial for instrument overall performance.

Some applications require an ability to cover a very large dynamic range in UV absorption measurement. A way to meet this requirement is to place two UV flow cells with different path lengths in series. Both high and low absorbance substances can thereby be measured using the same device. To make this sort of measurement it is vital to have a short distance between the two UV flow cells. Placing two UV detectors close in the same module will enable this.

In one embodiment the at least two beam splitters of the measuring device are provided in the line of the first light ray from the light source such that a reflected part of light from each semi-transparent mirror will pass a respective one of the flow cells and the transmission properties of each semi-transparent mirror being adapted for providing equally big light parts to pass through each flow cell and for providing a further light part to a reference detector comprised in the measuring device, said reference detector being provided after the beam splitters in the line of the first light ray from the light source.

Further embodiments are described in the dependent claims.

DETAILED DESCRIPTION OF THE EMBODIMENTS

Figure 1:
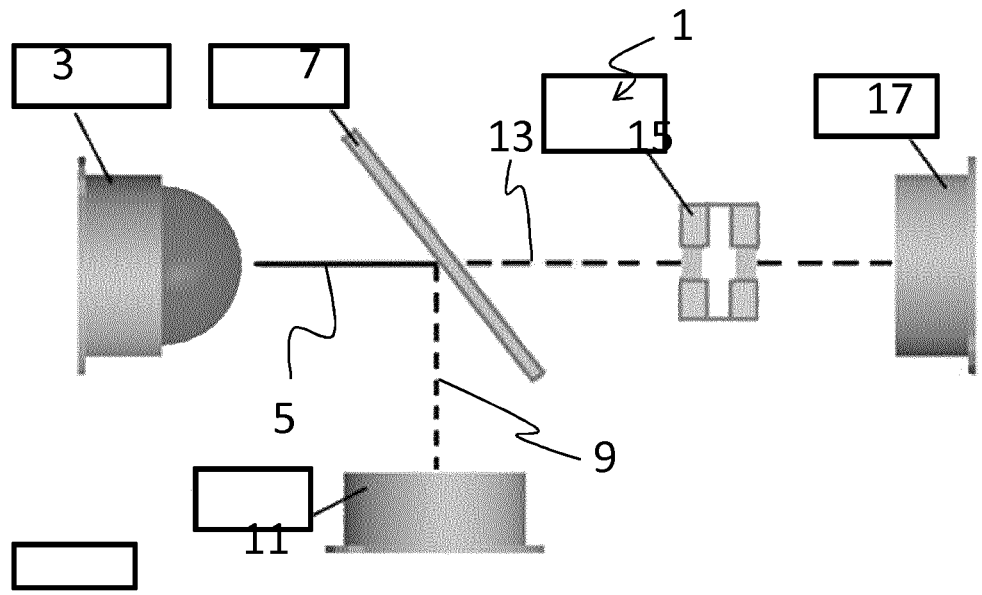
FIG. 1 shows schematically a UV detector of prior art.

FIG. 1 shows schematically a UV detector 1 of prior art. It comprises a light source 3, for example a LED, transmitting a light ray 5 towards a semi-transparent mirror 7, also called a beam splitter. The semi-transparent mirror is arranged in the UV detector with an angle differing from 90 degrees towards the light ray 5. One part of the incoming light will be reflected, here called the reflected part 9. A reference detector 11 is provided for receiving said reflected part 9. One part of the incoming light to the semi-transparent mirror 7 will be transmitted through the semi-transparent mirror. This part of the light will be called the transmitted part 13. The transmitted part 13 of the light is directed through a flow cell 15 comprising a solution. This solution is the solution in which the absorbance of UV light is measured by this UV detector. The solution can for example be taken from a chromatography system for inline measuring of absorbance of the solution. Certain substances in the solution will absorb the UV light of a certain wavelength. If for example a certain protein is searched for, a corresponding wavelength is transmitted from the light source 3 and the absorbance of said light will give a measure of the amount of protein in the solution.

The flow cell 15 needs to have inlet and outlet openings which are transparent for the light passing through the flow cell. After the flow cell a sample detector 17 is provided for detecting the light having passed through the flow cell and its sample provided in the flow cell. The detector responses from the reference detector 11 and the sample detector 17 are compared for giving a measure of the absorbance in the solution.

Figure 2:
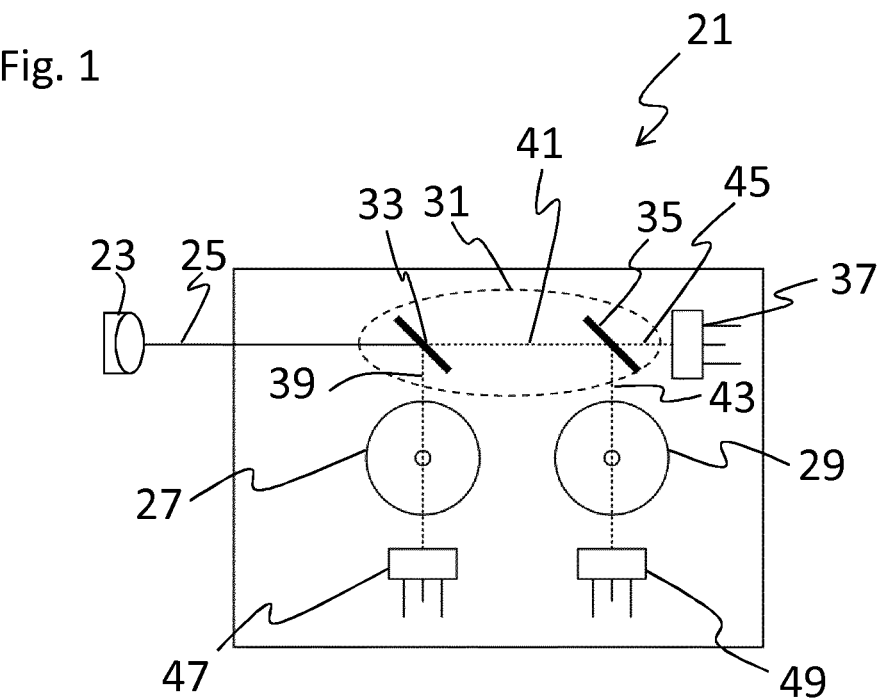
FIG. 2 shows schematically a measuring device for measuring the absorbance of a substance in a solution according to one embodiment of the invention.

FIG. 2 shows schematically a measuring device 21 for measuring the absorbance of a substance in a solution according to one embodiment of the invention.

The measuring device 21 comprises a light source 23 transmitting a first light ray 25. The light source can be for example a laser or a LED, possibly together with a band pass filter. The measuring device 21 comprises further according to the invention at least two flow cells. In this embodiment a first flow cell 27 and a second flow cell 29 are shown. The flow cells 27, 29 need to be at least partially transparent for the light being used for the measuring. Light passing through the flow cells for the measuring purpose of this invention should not be absorbed by the flow cell construction. Each flow cell 27, 29 contain a solution whose absorbance should be measured. This could be the same solution in both the first and second flow cell 27, 29 or different solutions. As described above in relation to prior art the solution could for example be taken from a chromatography system for inline measurements during chromatography.

The measuring device 21 comprises further an optical arrangement 31. According to the invention the optical arrangement 31 comprises at least two beam splitters, in this embodiment comprising semi-transparent mirrors with different transmission properties. In this shown embodiment the optical arrangement 31 comprises a first semi-transparent mirror 33 and a second semi-transparent mirror 35. According to the invention said optical arrangement 31 is arranged for dividing the first light ray 25 coming from the light source 23 into separate light parts, one for passing each flow cell 27, 29 and one for entering directly a reference detector 37. In the embodiment shown in FIG. 2 the first semi-transparent mirror 33 is arranged in the measuring device 21 with an angle towards the first light ray 25 from the light source 23. The angle is here shown to be essentially 45 degrees however another angle differing from 90 degrees can also be used. The first light ray 25 will be partly reflected against and partly transmitted through the first semi-transparent mirror 33. The reflected part is here called a first reflected part 39 and the transmitted part is here called a first transmitted part 41.

The second semi-transparent mirror 35 is in this embodiment of the invention arranged after the first semi-transparent mirror 33 on a straight line in the direction of the first light ray 25. Also the second semi-transparent mirror 35 is arranged with an angle towards the incoming light, which now is the first transmitted part 41 transmitted through the first semi-transparent mirror 33. The angle is here shown to be substantially 45 degrees but it could be another angle however not 90 degrees. The incoming light to the second semi-transparent mirror 35 will be partly reflected against and partly transmitted through the second semi-transparent mirror 35. The reflected part is here called a second reflected part 43 and the transmitted part is here called a second transmitted part 45.

The first flow cell 27 is arranged in the measuring device 21 such that the first reflected part 39 will pass through the first flow cell 27 and the second flow cell 29 is arranged in the measuring device 21 such that the second reflected part 43 will pass through the second flow cell 29. The transmission properties of each semi-transparent mirror are in one embodiment of the invention adapted for providing equally big light parts to pass through each flow cell 27, 29 and to the reference detector 37. However, in another embodiment of the invention the light parts are not necessarily equally big. In one embodiment the light parts passing through the flow cells are equally big but the light part going to the reference detector can be different. In another embodiment all light parts are different in size and instead suitable amplification can be provided in each detector.

The reference detector 37 is provided in the measuring device 21 after the semi-transparent mirrors in the line of the first light ray 25 from the light source 23. The reference detector 37 is arranged in the measuring device 21 such that the second transmitted part 45 is transmitted to and detected by the reference detector 37.

For achieving equally big light parts through the two flow cells 27, 29 and to the reference detector 37 the transmission properties of the semi-transparent mirrors for this embodiment need to be as follows: The first semi-transparent mirror 33 need to reflect ⅓ of the light and transmit ⅔ of the light and the second semi-transparent mirror 35 need to reflect ½ of the light and transmit ½ of the light. With this arrangement ⅓ of the light from the first light ray 25 will be transmitted through each of the flow cells 27, 29 and ⅓ of the light will be received by the reference detector 37. An advantage with having equally big parts of the light passing each flow cell and possibly also entering the reference detector is that output from the detectors can be directly compared.

An advantage of the invention is that only one light source is used for two or more measurements. One light source ensures the use of the same wavelength for the measurements. Another advantage with the present invention is that the use of the same reference detector for two separate measurements will also limit a possible problem related to temperature drift, which may be a problem when comparing results from two separate measuring devices according to prior art. Furthermore a regulation of the light intensity from the light source can be performed by a control loop from the reference detector and when performing more than one measurement under the same control loop as will be the case according to the invention a risk of providing different light intensities for different measurements will be avoided. That could be a risk in prior art devices where one control loop is provided for each measurement. Another advantage is that space is saved. If for example UV detectors are provided on a chassis of a chromatography system or a filter system two or more UV detectors can be provided in the same position of the chassis where only one UV detector of prior art was provided.

The measuring device 21 comprises further one detector provided after each flow cell for detecting light having passed through the flow cells. In the embodiment shown in FIG. 2 a first detector 47 is arranged for receiving the first reflected part 39 after it has passed the first flow cell 27 and a second detector 49 is arranged for receiving the second reflected part 43 after it has passed the second flow cell 29. The first and second detectors 47, 49 detect the light and by comparing with the light detected by the reference detector 37 the absorbance of the sample in each flow cell can be determined. As discussed above for example the amount of a certain protein which is absorbing this certain wavelength of light in the sample can be derived from this.

Figure 3:
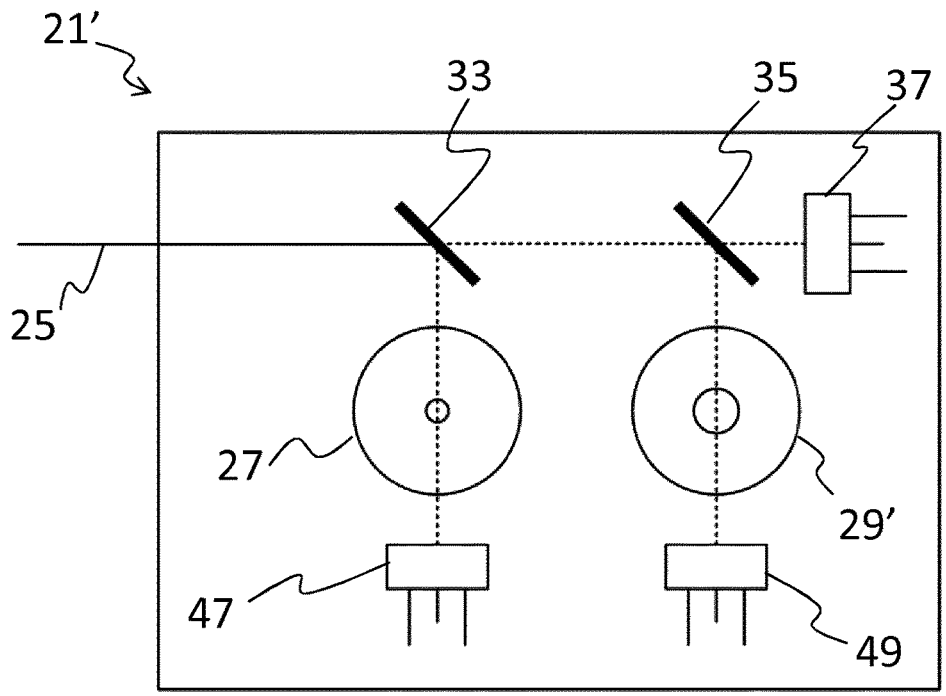
FIG. 3 shows schematically a measuring device for measuring the absorbance of a substance in a solution according to one embodiment of the invention.

FIG. 3 shows schematically a measuring device 21' for measuring the absorbance of a substance in a solution according to one embodiment of the invention. Almost all the details and parts of the measuring device 21' according to this embodiment of the invention are identical to the parts of the embodiment shown in FIG. 2 and therefore names and numbers are the same and the description will not be repeated. The only difference is that in this embodiment it is shown that the flow cells 27, 29' can have different path lengths. The second flow cell 29' is shown to have a larger path length than the first flow cell 27. Some applications require an ability to cover a very large dynamic range in UV absorption measurement. A way to meet this requirement is to place two UV flow cells with different path lengths in series. Both high and low absorbance substances can thereby be measured using the same device. To make this sort of measurement it is vital to have a short distance between the two UV flow cells. Placing two UV detectors close in the same module will enable this.

Figure 4:
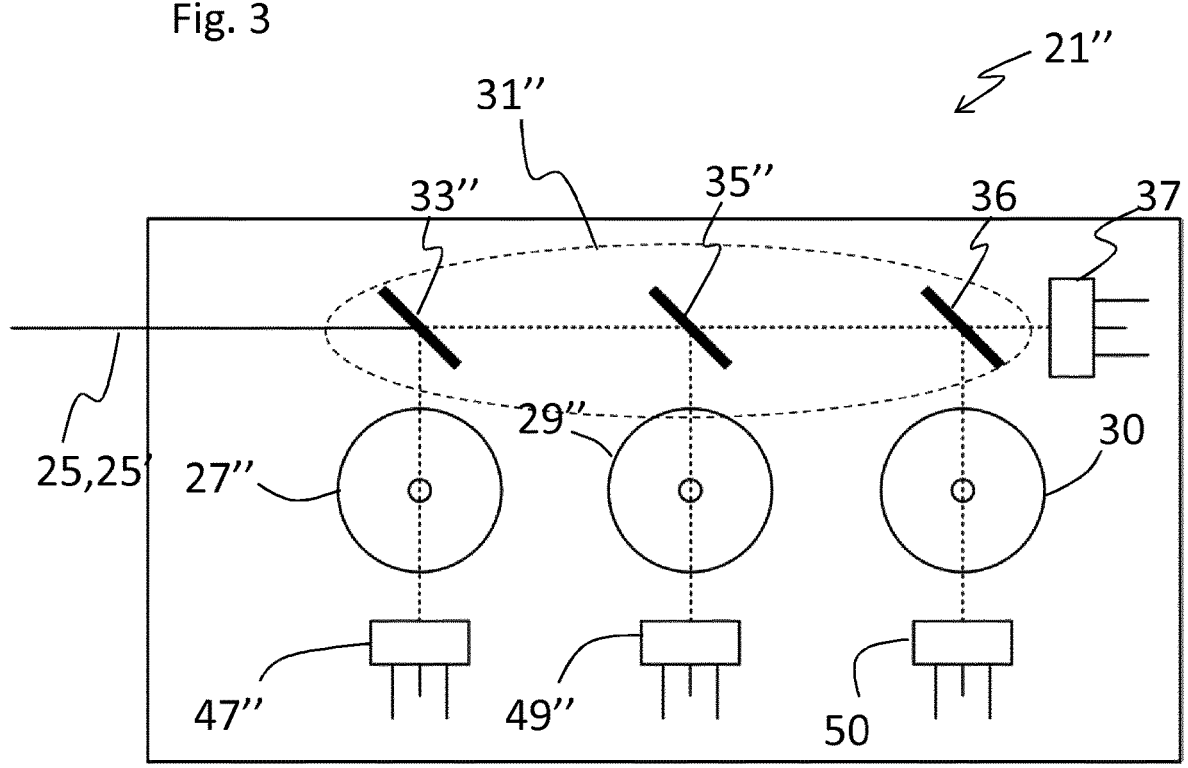
FIG. 4 shows schematically a measuring device for measuring the absorbance of a substance in a solution according to one embodiment of the invention.

FIG. 4 shows schematically a measuring device 21" for measuring the absorbance of a substance in a solution according to one embodiment of the invention. The set-up is similar to the previously described embodiments and some obvious details will not be repeated. Numbers and names of the parts will correspond to the previously used numbers and names. The difference from the embodiments shown in FIGS. 2 and 3 is that three flow cells and three semi-transparent mirrors are used instead of two. By the same logic a measuring device can be provided comprising four flow cells and four semi-transparent mirrors or five flow cells and five semi-transparent mirrors and so on.

FIG. 4 will now be described in more detail. The measuring device 21" comprises a light source 23 transmitting a first light ray 25. The measuring device 21" comprises in this embodiment three flow cells, a first flow cell 27", a second flow cell 29" and a third flow cell 30. The measuring device 21" comprises further an optical arrangement 31". The optical arrangement 31" comprises in this embodiment three semi-transparent mirrors provided after each other along the line of the first light ray 25 in this embodiment guided within a light guide in this case an optical fibre 25'. The semi-transparent mirrors are here called a first semi-transparent mirror 33", a second semi-transparent mirror 35" and a third semi-transparent mirror 36. The transmission properties of the first, second and third semi-transparent mirrors 33", 35'", 36 are in one embodiment of the invention chosen such that three reflected parts of the light which will pass through one each of the three flow cells and possibly also a transmitted part from the third semi-transparent mirror 36 all will be equally big. As discussed above the light parts do not necessarily need to be equally big. The detectors can instead be provided with suitable amplification to compensate for light parts of different sizes. A reference detector 37" is provided in the line of the first light ray 25 after the three semi-transparent mirrors for receiving and detecting a transmitted part from the third semi-transparent mirror 36. Furthermore a first detector 47" is provided for receiving and detecting a reflected part of the light from the first semi-transparent mirror 33" after it has passed through the first flow cell 27", a second detector 49" is provided for receiving and detecting a reflected part of the light from the second semi-transparent mirror 35" after it has passed through the second flow cell 27" and a third detector 50 is provided for receiving and detecting a reflected part of the light from the third semi-transparent mirror 36 after it has passed through the third flow cell 30.

For achieving equally big light parts passing through the three flow cells 27", 29", 30 and entering the reference detector 37" the first semi-transparent mirror 27" will be arranged for reflecting ¼ and passing through ¾ of light coming in to the semi-transparent mirror surface. Furthermore the second semi-transparent mirror 35" will be arranged for reflecting ⅓ and passing through ⅔ of light coming in to the semi-transparent mirror surface and the third semi-transparent mirror 36 will be arranged for reflecting ½ and passing through ½ of light coming in to the semi-transparent mirror surface.

Furthermore the first flow cell 27" comprises a first solution and is arranged in a path of light being reflected from the first semi-transparent mirror 33". The second flow cell 29" comprises a second solution which could be the same or different from the first solution. The second flow cell 29" is arranged in a path of light being reflected from the second semi-transparent mirror 35". The third flow cell 30 comprises a third solution which could be the same or different from the first and second solutions. The third flow cell 30 is arranged in a path of light being reflected from the third semi-transparent mirror 36.

Also in this embodiment the flow path lengths can be varied.

The embodiments mentioned above have been described as working with a 'light ray' 25. For the avoidance of doubt it should be noted that such a ray could propogate through air, or could be guided by a light guide, for example an optical fibre 25' shown in FIG. 4. The embodiments shown above describe beam splitters in the form of semi-transparent mirrors 33,35, 33",35" and 36, however other beam splitters could be used in place of the mirror with equal effect, for example it is possible to split the beam using prismatic beam splitters, or fibre optic splitters such as a Biconical Taper (FBT) splitter or a Planar Lightwave Circuit (PLC) splitter. Such alternatives are envisaged in the schematic drawings illustrated. The invention extends to a measuring device for measuring the absorbance of a substance in at least one solution provided in at least two flow cells (27, 29; 27, 29'; 27", 29", 30) of the measuring device, wherein said measuring device comprises: a source for emitting light, a path 25 for propagating the light emitted by the source at a light intensity; an optical element including: a first beam splitter arranged to split the light into first and second fractions; and a second beam splitter arranged to split the second fraction into a third and fourth fraction; wherein the first beam splitter is arranged to propagate the first fraction toward a first of the two flow cells, and is arranged to propagate the second fraction toward the second beam splitter; and wherein the second beam splitter is arranged to propagate the third fraction toward a second of the flow cells.

In embodiments, said at least two flow cells may comprise two flow cells, and the first and third fractions may have around 33.3% of the light intensity, and the optical element may be further arranged to propagate the fourth fraction also having around 33.3% of the light intensity toward a reference detector.

In embodiments said at least two flow cells may comprise three flow cells and the optical element may further include a third beam splitter arranged to split the fourth fraction of light into a fifth fraction for propagating toward the third flow cell and a sixth fraction, and the first, third and fifth fractions may each have around 25% of the light intensity, and the optical element may be further arranged to propagate the sixth fraction also having around 25% of the light intensity toward a reference detector.

It may be that the beam splitters of such measurement devices each comprise; a semi-transparent mirror; a beam splitting prism; or a beam splitting optical light guide.

The invention claimed is:

1. A method for measuring the absorbance of light by a substance in at least one solution provided in two flow cells provided in a measuring device, said method comprising the steps of:
    transmitting a first light ray from a light source provided in the measuring device towards an optical arrangement provided in the measuring device;
    providing only two beam splitters in the optical arrangement, said optical arrangement being arranged for dividing the first light ray coming into the optical arrangement from the light source into separate light parts, one for propagating through each flow cell and one for entering a reference detector after the optical arrangement;
    detecting light having passed each flow cell;
    comparing each of the detected light having passed each flow cell to light detected by the reference detector for determining the absorbance of light of the substance in the solution at each flow cell,
    wherein the two beam splitters are arranged in the path of the first light ray from the light source such that a reflected part of light from each beam splitter will pass a respective one of the flow cells, and
    wherein the transmission properties of each beam splitter are adapted for providing light parts of about equal intensity to pass through each flow cell and for providing a further equal intensity of light part at the reference detector, said reference detector being provided after the beam splitters in the path of the first light ray from the light source.

2. The method according to claim 1, wherein the two beam splitters each comprise a semi-transparent mirror or a beam splitting prism or a light guide, the semi-transparent mirrors or beam splitting prisms or light guides each having a semi reflective surface, the method comprising the steps of:
    transmitting a first light ray from a light source provided in the measuring device towards a first semi reflective surface provided in the optical arrangement, said first semi reflective surface being angled in relation to the light direction of the first light ray;
    reflecting ⅓ of the incoming light from the first semi reflective surface and passing through ⅔ of the light;
    providing the light passed through the first surface to a second semi reflective surface provided in the optical arrangement, said second semi reflective surface being angled in relation to the incoming light direction;
    reflecting half of the incoming light from the second semi reflective surface and passing through half of the incoming light;
    providing the light reflected from the first semi reflective surface through a first flow cell comprising a first solution;
    providing the light reflected from the second semi reflective surface through a second flow cell comprising a second solution;
    detecting light having passed through the first flow cell by a first detector provided in the measuring device;

detecting light having passed through the second flow cell by a second detector provided in the measuring device; and detecting light having passed through the second semi-transparent mirror by the reference detector.

3. The method according to claim 1, wherein the solution at each flow cell is the same solution.

4. A measuring device for measuring the absorbance of light by a substance in at least one solution provided in two flow cells of the measuring device, wherein said measuring device comprises:

a light source transmitting a first light ray;

two flow cells;

an optical arrangement consisting of only two beam splitters with different light transmission properties, said optical arrangement being arranged for dividing the first light ray coming from the light source into separate light parts, one for passing each flow cell and one for entering directly after the optical arrangement a reference detector; and one detector provided after each flow cell for detecting light having passed through the flow cells, wherein the two beam splitters are semi-transparent mirrors and are provided in the line of the first light ray from the light source such that a reflected part of light from each semi-transparent mirror will pass a respective one of the flow cells and transmission properties of each semi-transparent mirror being adapted for providing light parts of about equal intensity to pass through each flow cell and for providing a further equal intensity of light part at the reference detector, said reference detector being provided after the semi-transparent mirrors in the line of the first light ray from the light source.

5. The measuring device according to claim 4, wherein the two flow cells are a first flow cell and a second flow cell, and the two beam splitters are a first beam splitter comprising a first semi-transparent mirror and a second beam splitter comprising a second semi-transparent mirror, wherein:

the first semi-transparent mirror which is reflecting ⅓ and passing through ⅔ of light coming in to the first semi-transparent mirror surface, said first semi-transparent mirror being arranged in the measuring device with an angle towards the first light ray from the light source; and the second semi-transparent mirror which is reflecting ½ and passing through ½ of light coming in to the second semi-transparent mirror surface, said second semi-transparent mirror being arranged in the measuring device with an angle towards light having passed through the first semi-transparent mirror;

and wherein the measuring device further comprises the first flow cell comprising a first solution, said first flow cell being arranged in a path of light being reflected from the first semi-transparent mirror;

the second flow cell comprising a second solution, said second flow cell being arranged in a path of light being reflected from the second semi-transparent mirror;

a first detector positioned for detecting light having passed through the first flow cell;

a second detector positioned for detecting light having passed through the second flow cell; and a reference detector positioned for detecting light having passed through the second semi-transparent mirror.

6. The measuring device according to claim 4, wherein the flow cells comprises different path lengths.

7. The measuring device according to claim 5, further comprising the first solution and second solution, wherein the first solution and second solution are the same solution.

8. A measuring device for measuring the absorbance of a substance in at least one solution provided in three flow cells of the measuring device, wherein said measuring device comprises:

a source for emitting light, a path for propagating the light emitted by the source at a light intensity;

an optical element including:

only three beam splitters wherein a first beam splitter is arranged to split the light into first and second fractions, a second beam splitter is arranged to split the second fraction into third and fourth fractions, and a third beam splitter is arranged to split the light into fifth and sixth fractions;

wherein the first beam splitter is arranged to propagate the first fraction toward a first of the three flow cells, and is arranged to propagate the second fraction toward the second beam splitter;

wherein the second beam splitter is arranged to propagate the third fraction toward a second of the three flow cells, and is arranged to propagate the fourth fraction toward the third beam splitter;

and wherein the third beam splitter is arranged to propagate the fifth fraction toward a third of the three flow cells;

wherein the first, second, and third beam splitters are arranged in the path of the emitted light from the light source such that a reflected part of light from each beam splitter will pass a respective one of the flow cells, and wherein transmission properties of each beam splitter are adapted for providing light fractions of about equal intensity to pass through each flow cell.

9. The measurement device as claimed in claim 8, wherein the beam splitters each comprise: a semi transparent mirror; a beam splitting prism; or a beam splitting optical light guide.

10. The measuring device according to claim 8, further comprising the at least one solution, wherein the at least one solution is only one solution.

* * * * *